US007711674B2

(12) United States Patent
Arthur et al.

(10) Patent No.: US 7,711,674 B2
(45) Date of Patent: May 4, 2010

(54) SYSTEM AND METHOD FOR AUTOMATIC DESIGN OF COMPONENTS IN LIBRARIES

(75) Inventors: W. Brian Arthur, Palo Alto, CA (US); Wolfgang H. Polak, Sunnyvale, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 530 days.

(21) Appl. No.: 11/264,219

(22) Filed: Nov. 1, 2005

(65) Prior Publication Data

US 2007/0100784 A1   May 3, 2007

(51) Int. Cl.
*G06F 15/00* (2006.01)
(52) U.S. Cl. ............... 706/62; 706/13; 717/120; 717/107; 717/126; 235/382
(58) Field of Classification Search ............... 706/62, 706/13; 717/120, 107, 126; 235/382
See application file for complete search history.

(56) References Cited

U.S. PATENT DOCUMENTS

| | | | |
|---|---|---|---|
| 5,136,686 A | | 8/1992 | Koza |
| 5,867,397 A | | 2/1999 | Koza et al. |
| 6,282,527 B1 * | | 8/2001 | Gounares et al. ............. 706/13 |
| 6,427,230 B1 * | | 7/2002 | Goiffon et al. ............. 717/108 |
| 6,434,490 B1 | | 8/2002 | Agrafiotis et al. |
| 6,499,129 B1 * | | 12/2002 | Srinivasan et al. ............. 716/4 |
| 6,839,874 B1 * | | 1/2005 | Fang ............. 714/738 |
| 2003/0046282 A1 * | | 3/2003 | Carlson et al. ............. 707/6 |
| 2003/0182470 A1 * | | 9/2003 | Carlson et al. ............. 709/328 |
| 2005/0137992 A1 | | 6/2005 | Polak |

OTHER PUBLICATIONS

"Coevolving High-Level Representations", P. J. Angeline and J. B. Pollack, Artificial Life III, The Ohio State University, Jan. 17, 1996, pp. 1-14.*
"A Library Model for a Verification Environment", W. Polak, Odyssey Research Associates, Jan. 1990.*
"Principles in the Evolutionary Design of Digital Circuits—Part I", J. F. Miller, D. Job, V. K. Vassilev, Genetic Programming and Evolvable Machines, vol. 1, Apr. 2000, pp. 7-35.*
"Evolving Objects: A General Purpose Evolutionary Computation Library", M. Keijzer, J. J. Merelo, G. Romero, M. Schoenauer, LNCS 2310, 2002, pp. 231-242.*

(Continued)

*Primary Examiner*—Donald Sparks
*Assistant Examiner*—Mai T Tran
(74) *Attorney, Agent, or Firm*—Fliesler Meyer LLP

(57) ABSTRACT

Embodiments of the present invention introduce a novel recursive assembly process to automatically create a library of components. It starts with simple components used as building blocks and proceeds by repeatedly combining these randomly into more complex ones. The utility and quality of these random combinations of components are measured against a set of functional goals. Useful combinations then become new components in the library that can be used as building blocks for further random combination. This description is not intended to be a complete description of, or limit the scope of, the invention. Other features, aspects, and objects of the invention can be obtained from a review of the specification, the figures, and the claims.

19 Claims, 12 Drawing Sheets

OTHER PUBLICATIONS

"Autonomous library for evolutionary algorithms", M. Sprogar, Electrotechnical Conference, May 12-15, 2004, Proceedings of the 12$^{th}$ IEEE Mediterranean, vol. 2, pp. 591-594.*

Fidge, Colin, A comparative introduction to CSP, CCS, and LOTOS, University of Queensland, Australia, Technical Report, Jan. 1994.

Dijkstra, Edsger W., Guarded commands, nondeterminacy and formal derivation of programs, Communications of the ACM, Vo. 18, No. 8, pp. 453-457, 1975.

Bibel, W., et al., A multi-level approach to program synthesis, In Proc. 7th International Workshop on Logic Program Synthesis and Transformation, N. Fuchs (ed.), 1998, pp. 1-25, Springer Verlag.

Blickle, Tobias, et al., A mathematical analysis of tournament selection, In Proc. 6th International Conference on Genetic Algorithms, Larry Eshelman (ed.) 1995, pp. 9-16, Morgan Kaufman.

Bryant, Randal E., Symbolic Boolean manipulation with ordered binary-decision diagrams, ACM Computing Surveys, Vo. 24, No. 3, pp. 1-34, Jun. 1992.

Goldberg, David et al., A comparative analysis of selection schemes used in genetic algorithms, in "Foundations of genetic algorithms". G. Rawlins (ed.) 1991, pp. 69-93.

Lenski, Richard E., et al., The evolutionary origin of complex features. Nature, vol. 423, May 8, 2003, pp. 139-144.

Parnas, D. L., A technique for software module specification with examples. Communications of the ACM, vol. 15, No. 5, May 1972, pp. 330-336.

Angeline, Peter J. et al., The evolutionary induction of subroutines. In Proc. 14th Annual Conference of the Cognitive Science Society, 1992.

Krzysztof, R. Apt, Ten years of Hoares logic: A survey—Part I. ACM Transactions on Programming Languages and Systems, vol. 3, No. 4, 1981, pp. 431-483.

Fischer, Bernd, Deduction-based software component retrieval. Doctoral Dissertation, Universitat Passau, Nov. 2001.

Milner, Robin et al., A calculus of mobile processes, part I. Information and Computation, Jun. 1989.

Milner, Robin et al., A calculus of mobile processes, part II. Information and Computation, Jun. 1989.

Koza, John R., Simultaneous discovery or reusable detectors and subroutines using genetic programming. In Proc. 5th International Conference on Genetic Algorithms, Stephanie Forrest (ed.), Jul. 1993, pp. 295-302, Morgan Kaufman.

Milner, Robin The polyadic pi-calculus: a tutorial. Proc. of the International Summer School on Logic and Algebra of Specification, Oct. 1991.

Koza, John R., Evolving the architecture of a multi-part program in genetic programming using architecture-altering operations. In Proc. 4th Annual Conference on Evolutionary Programming, McDonnel et al. (eds.) pp. 695-717, Mar. 1995, San Diego, CA, MIT Press.

Jeng, Jun-Jang, et al., Specification matching for software reuse: A foundation. Proc. of ACM Symposium on Software, Apr. 1995, pp. 97-105, Seattle, WA.

Goldberg, David E., A note on Boltzmann Tournament Selection for Genetic Algorithms and Population-Oriented Simulated Annealing, Complex Systems, vol. 4, No. 4, 1990, pp. 445-460.

* cited by examiner

US 7,711,674 B2

SYSTEM AND METHOD FOR AUTOMATIC DESIGN OF COMPONENTS IN LIBRARIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to the field of automatic design of component libraries.

2. Description of the Related Art

As computer systems become more pervasive, economic ways of software construction become increasingly important. Traditionally, several approaches have been taken to reduce software cost: libraries of reusable software code, domain-specific techniques and languages, evolutionary approaches, and deductive, logic-based methods. These traditional software component libraries are created manually at great cost. In the area of digital circuits, component libraries have been in use for a long time. Digital components that are useful are encapsulated as integrated circuits. Virtually all digital design builds upon libraries or catalogs of integrated circuits. Much research has been focused on the use of mathematical logic to generate design artifacts from formal specifications. This work has so far been successful in the area of digital circuits but has had only limited success in the construction of software code.

SUMMARY OF THE INVENTION

Various embodiments of the present invention combine aspects of all of known techniques described above with a novel recursive assembly process that automatically creates a library of components, which can be but are not limited to, computer software components, digital circuits, mechanical and architectural designs, or other kinds of (design) artifacts that can be composed hierarchically and can be represented and manipulated in a computer system. The invention starts with simple components used as building blocks and proceeds by repeatedly combining these randomly into more complex ones. The utility and quality of these random combinations of components are measured against a set of functional goals. Useful combinations then become new components in the library that can be used as building blocks for further random combination. In this way, the invention develops a library of useful components that bootstraps itself from simpler components to a collection of more complex ones. Existing components are replaced when better solutions are found. The set of functional goals, chosen by the user, directs the system towards components that solve a particular class of problems.

BRIEF DESCRIPTION OF THE DRAWINGS

Certain embodiments of the present invention will be described in detail on the following figures, wherein.

DETAILED DESCRIPTION OF THE INVENTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Figure 1:
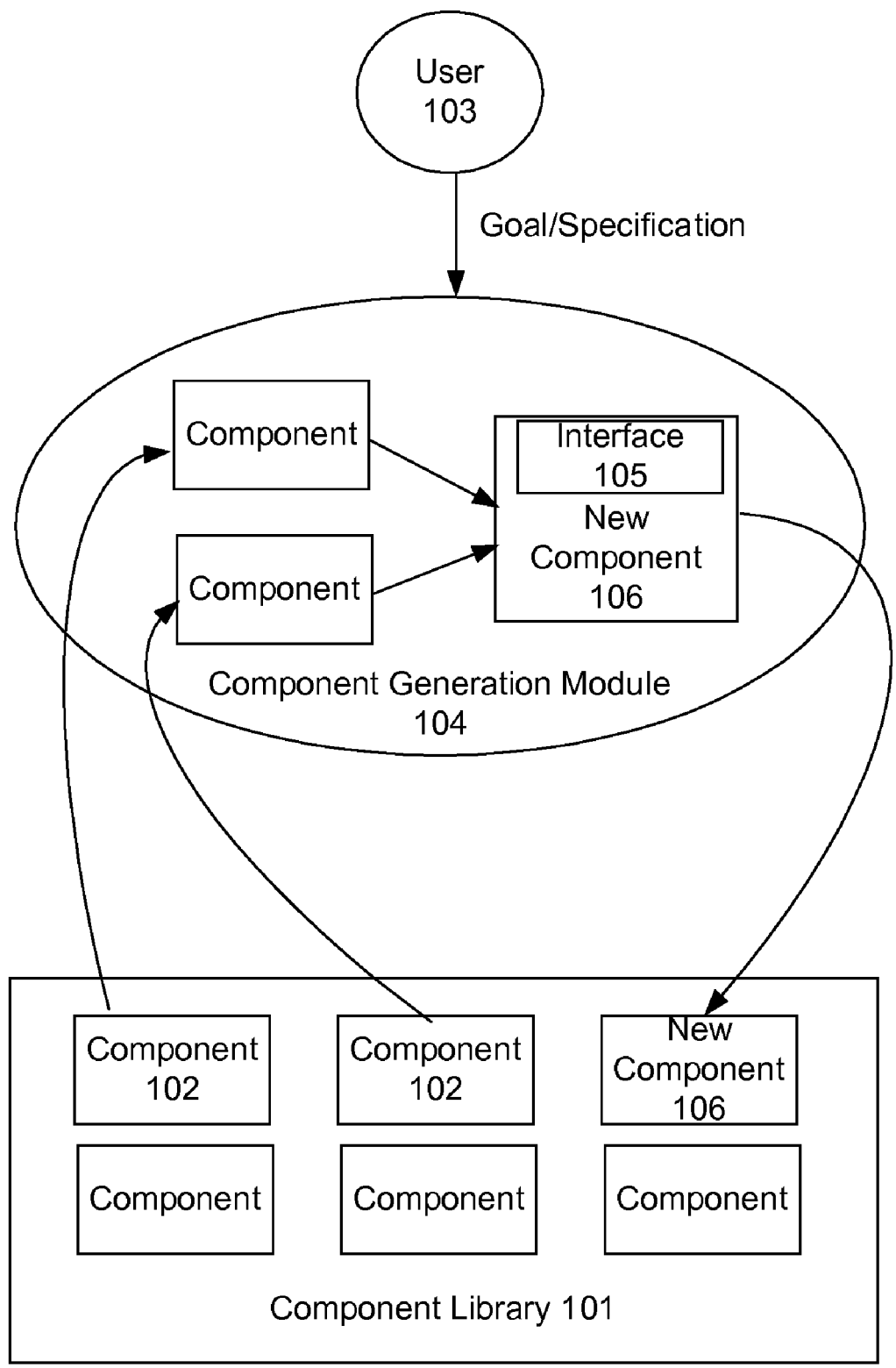
FIG. 1 is an illustration of an exemplary automatic library design system in one embodiment of the present invention.

FIG. 1 is an illustration of an exemplary automatic component library design system in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, the present invention enables the automatic construction of a component library 101 from specifications. These libraries are not static and, over time, will automatically improve as better, more efficient components evolve. The following describes the principles of operation of the invention in general terms, independent of a particular application area.

A component 102 can perform a certain function. The present invention requires that it is possible to determine the function for a given component or combination of components in a library. Some of the components are considered primitive, i.e., they are known basic building blocks. A goal is a formal specification of the function of a desired component defined by a user 103. A component generation module 104 can use several components to create a combination subject to certain design rules. For a non-limiting example, combinations of digital components can be created by wiring together the components; combinations of software components can be created by invoking subprograms. The component generation module can also measure how well a component or combination satisfies a goal. Components and combinations can be compared to determine if one better satisfies a goal than another. Note that not all components and combinations can be compared in this way, i.e., neither may be better than the other in all respects (mathematically, their relation is a partial order).

Distinct from its function, there is a cost associated with each component. For digital circuits, the cost may be the number of components needed to build it, and the cost of a software component may be its computational efficiency. A combination can be encapsulated by the component generation module to create a new component 106 by designating an interface 105 to the combination and adding the new component back to the library. The combination, its structure and subcomponents, is called the design of the new component. In effect, the new component is a black box with a hidden design where only the interface is observable. It can be used in further combinations. In this manner useful combinations can become new components in the library. Thus, components are recursive assemblies built from combinations of components which, in turn, may be built from combinations of components and so on.

Figure 2:
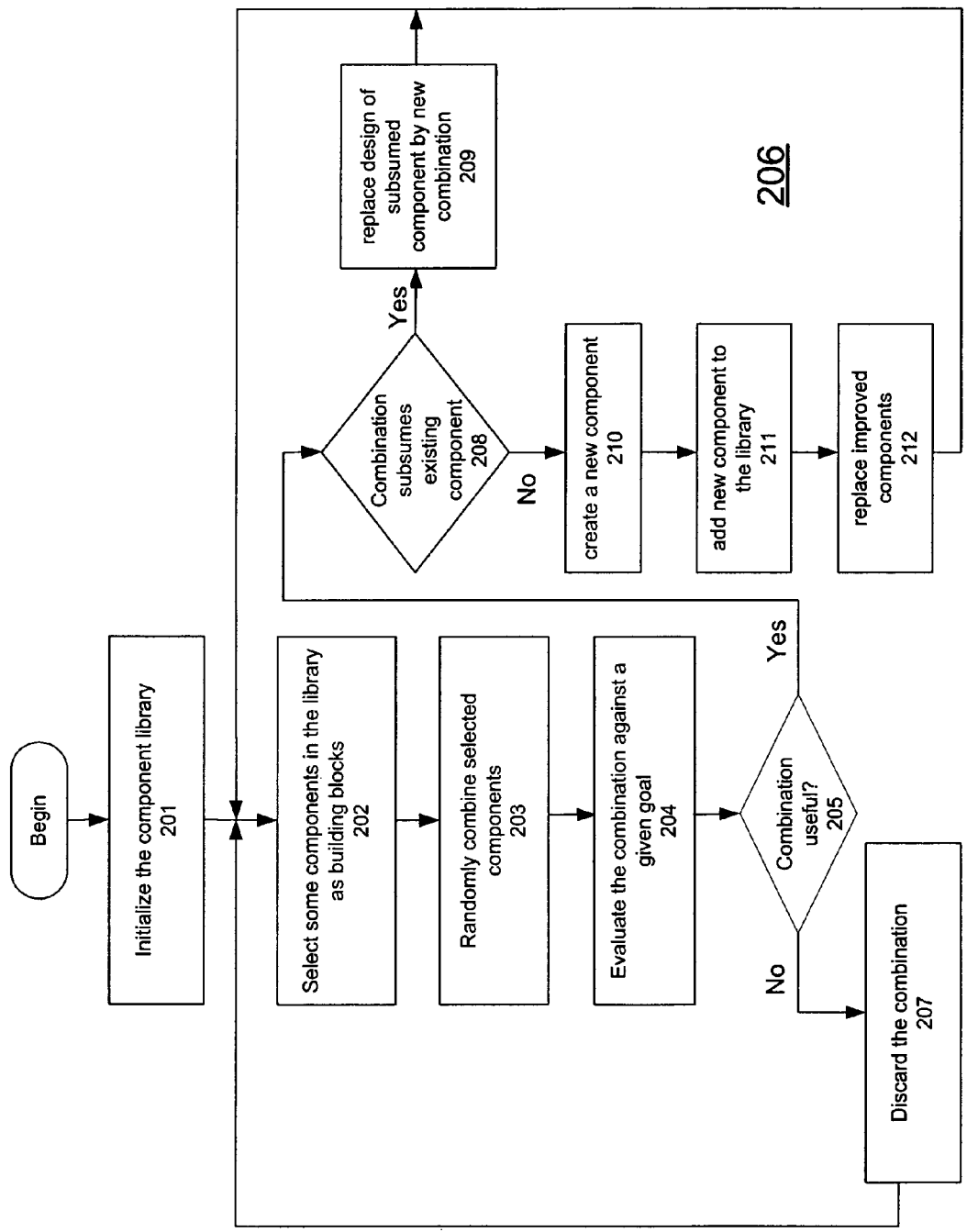
FIG. 2 is a flow chart illustrating an exemplary process of automatic component library design in one embodiment of the present invention.

FIG. 2 is a flow chart illustrating an exemplary process of automatic component library design in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, the process takes as input a set of goals and a set of primitive components. It initializes the library at step 201 with a small set of primitive components placed in it. At step 202, some of the components of the library are selected as building blocks that are combined randomly at step 203. The result is evaluated against the user-specified goals at step 204 and, if it is determined to be useful 205, is added as a new component to the library as shown generally at step 206 and becomes a possible building block for future components. Otherwise, the combination will be discarded at step 207. These steps can be repeated until a satisfactory component library is obtained.

The individual steps of FIG. 2 can be described in more detail as the following:

Initialize the library 201. The given primitive components are added to the library.

Figure 3:
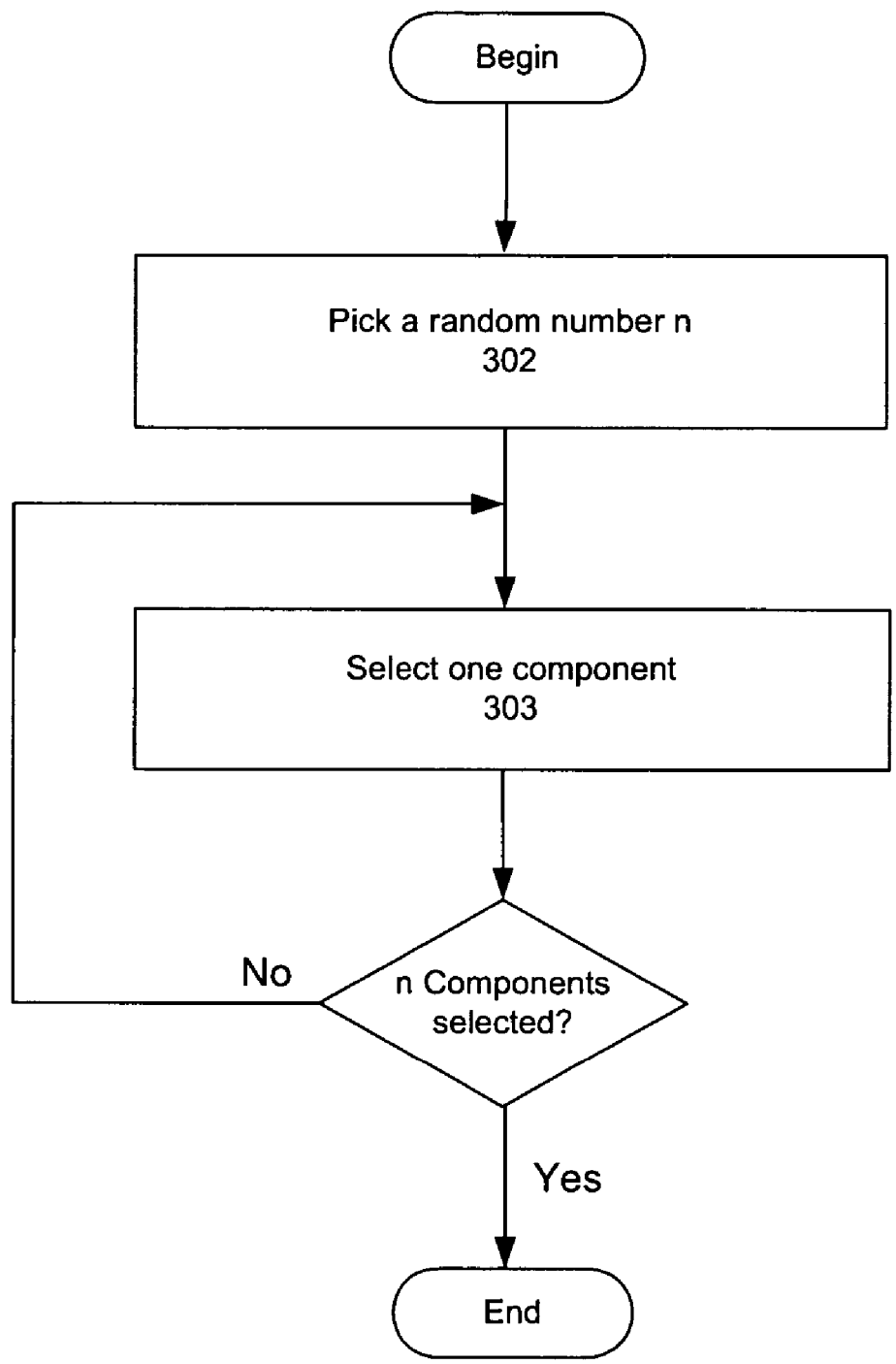
FIG. 3 is a flow chart illustrating an exemplary process of component selection in one embodiment of the present invention.

Select some components 202. In this step (as detailed by the exemplary flow chart shown in FIG. 3), a small number of components are selected from the library based on a selection function. The selection function, described in more detail later, randomly selects components but may prefer some of the components over others, i.e., some components may be selected with higher probability than others. The exact number of components selected will depend on the nature of the components and the available combination operators. In one embodiment of the invention, this number n was chosen randomly at step 302 between 2 and 12 for each selection step. The best range n may depend on the nature of the components being manipulated. A component can then be selected at step 303, and the process continues until n components are chosen. Note that in this step the same component can be selected several times.

Randomly combine selected components 203. The selected components can be combined randomly subject to the combination rules of the domain. In one embodiment, components can be wired together to form circuits. This wiring is subject to rules such that, for a non-limiting example, two output pins cannot be connected. The rules may be tested while building the combination or they may be tested once the combination has been created. For instance, in the case of software components, a compiler or similar analysis tool can be used to determine if a combination constitutes valid software code. If such a test fails, a different combination is tried.

Evaluate the combination 204. The function of the combination is determined, and it is further determined how this function relates to the given goals. Since the combination is generated randomly, its function may not be related to the given goals at all. In this case, the combination is deemed not useful.

The combination is useful 205 and should be added to the library 206. Does the combination subsume an existing component 208. If the combination is functionally equivalent to an existing component and if the new combination performs this function more cheaply than the existing component, the new combination subsumes the existing component.

Replace the design of a subsumed component by the new combination 209. Since the new combination performs the same function as the existing component but does so more cheaply, it is preferable to the existing component in all respects. In this step the design of the existing component is replaced with the new combination, a new design. This replacement affects all components that have been built with the subsumed component.

Create a new component 210. In this step, the new combination is encapsulated as a new component. The new component will be associated with the goal that is most closely matched by its function.

Add the new component to the library 211.

Replace the improved components 212. All components in the library that match the same goals as the new component are checked to see if the new component better matches that goal. If so, the existing component is removed from the library (it will therefore not be considered for selection for further combinations). However, any use of the existing component in the design of other components will not be affected (in contrast to the replacements of subsumed components above).

This approach is viewed as a continual process of the invention and improvement that will never terminate. In other words, it will continually improve components in the library based on a given set of goals. From time to time, a user may add a new goal, and the process will attempt to find a new component that satisfies this goal at that point. If so desired, the process may be terminated when all goals have been satisfied by components of sufficiently low cost.

Traditional methods often adopt evolutionary techniques that use random constructions and selection based on fitness. The use of a goal-directed combination of components by the present invention into new, more complex components is novel and the idea of replacement of existing components by better ones is new. It differs fundamentally in the kind of random operations used, the manner in which fitness is determined and the structure of goals. The user-provided goals can be defined using a formal logical language. Rather than attempting to transform these formal specifications into conforming components, as is done in traditional synthesis, the present invention uses the specifications only to measure the quality of components generated by the recursive assembly process described in this invention. The present invention is therefore applicable to situations where a constructive way to generated designs from specifications is not known. The efficiency with which the present invention finds good components depends on the functional goals given by the user. Generally the best performance is achieved with many goals of increasing difficulty.

Possible users of this invention vary depending of the kind of library components being constructed, which can be but are not limited to:

Business Process Automation. A company can use the invention to create a library of business processes and provide customized business process automation for their clients. Starting with primitive business process steps, more complex automated business processes are constructed based on goals that in this case are customer needs and requirements. In this manner much of the company's services can be automated and processes developed for previous clients can be reused.

Software Development. Developers of custom software, particularly those that focus on a narrow domain of expertise, which includes but does not limit to, robotics and control systems, can make use of the invention by accumulating a library of increasingly complex software solutions, driven by customer needs, to quickly and cheaply respond to new orders.

Electronic Design. Designers of electronic devices build new circuits by combining existing integrated circuits (ICs). In doing so they construct sub-assemblies and develop design patterns that are reused repeatedly. The present invention can support this activity with a library that maintains increasingly complex circuits. Starting with existing ICs as primitives, new circuits or sub-assemblies are constructed and old ones are improved automatically. The goals driving this process are the functional requirements of the designer's customers. Similar potential users may be found in areas such as mechanical design and other disciplines that use computer aided design methods.

In various embodiments of the present invention, the component building process is guided by a set of user-provided goals that specify the domain of interest. The goals themselves can have rigorous mathematical descriptions and utilize domain-specific languages and formalisms that focus on narrow application domains, allowing for more automation. The user-provided goals determine the domain of the components to be created. For a non-limiting example, the components in a library may be digital circuits for arithmetic operation, while a different set of goals may lead to a library of circuits for multiplexers and so on.

One embodiment for the automatic design of the non-limiting example of non-cyclic digital circuits is described in detail below. In this embodiment, the elements of the circuits can be realized as follows:

Component. Components are encapsulated digital circuits with varying number of input and output pins. All circuits are non-cyclic and asynchronous (no clock signal is used). The inputs and outputs of a component are those pins designated as input and output respectively. One can think of these as traditional integrated circuits. No power and ground connections are shown.

Primitive. The NAND gate is the only primitive component.

Goal. Goals are vectors of logic functions, represented as vectors of binary decision diagrams (BDDs), one BDD for each function. A goal can be thought of as the specification of an integrated circuit which is to be designed: it specifies the logic functions for all output pins in terms of the values of the input pins.

Combination. Combinations are several components wired together. The inputs of a combination are all inputs of any of its constituent components that are not connected to an output. The outputs of a combination are all the outputs of all of its constituent components.

Specific details of the steps of the component construction process for the preferred embodiment can be as follows:

Initialize the library. The NAND gate is added to the library.

Select some components. A number n between 2 and 12 can be determined randomly. Then n components are selected randomly from the library, i.e., the selection function is random choice.

Figure 4:
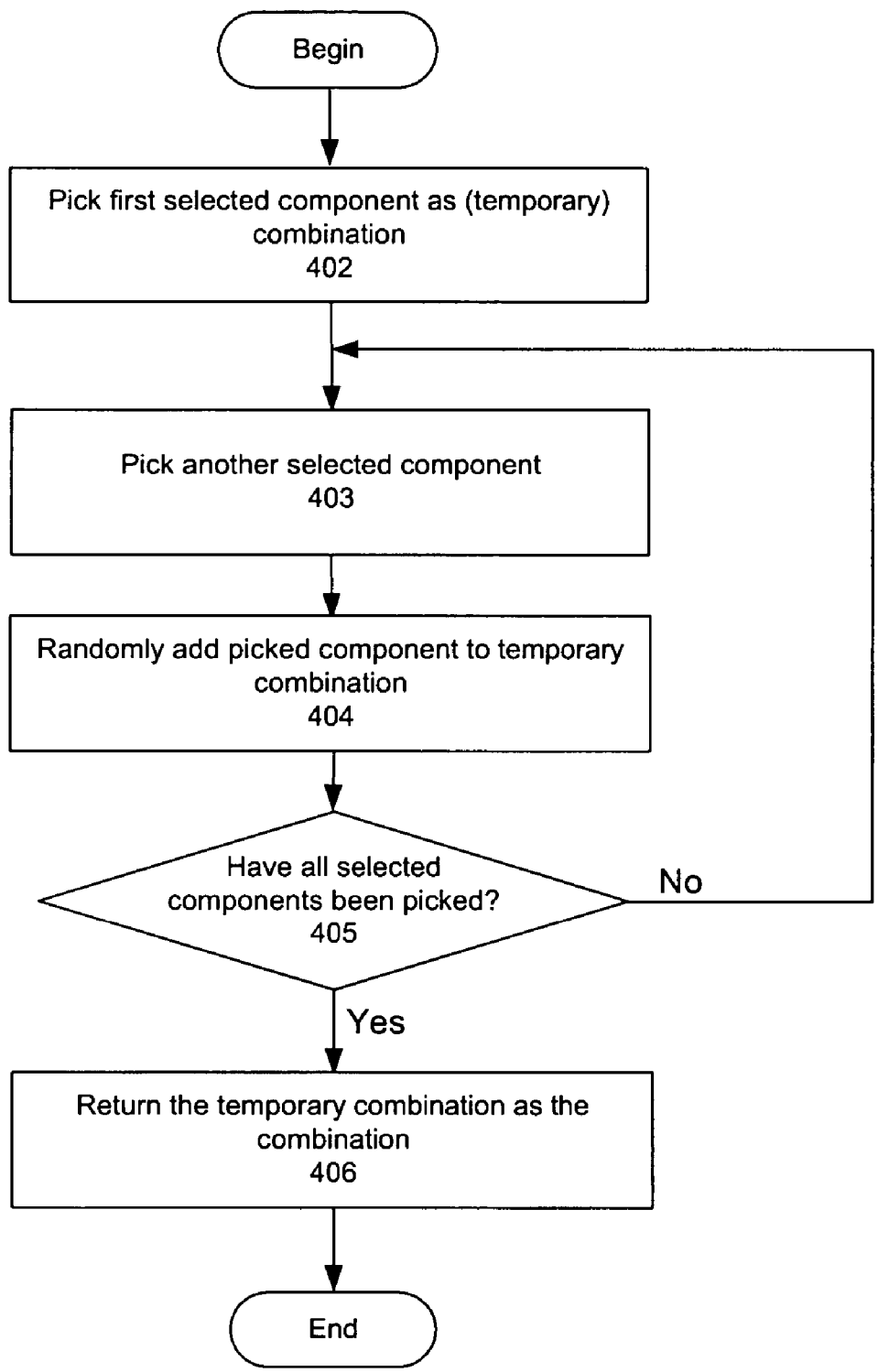
FIG. 4 is a flow chart illustrating an exemplary process of successively adding components to create a combination in one embodiment of the present invention.
Figure 5:
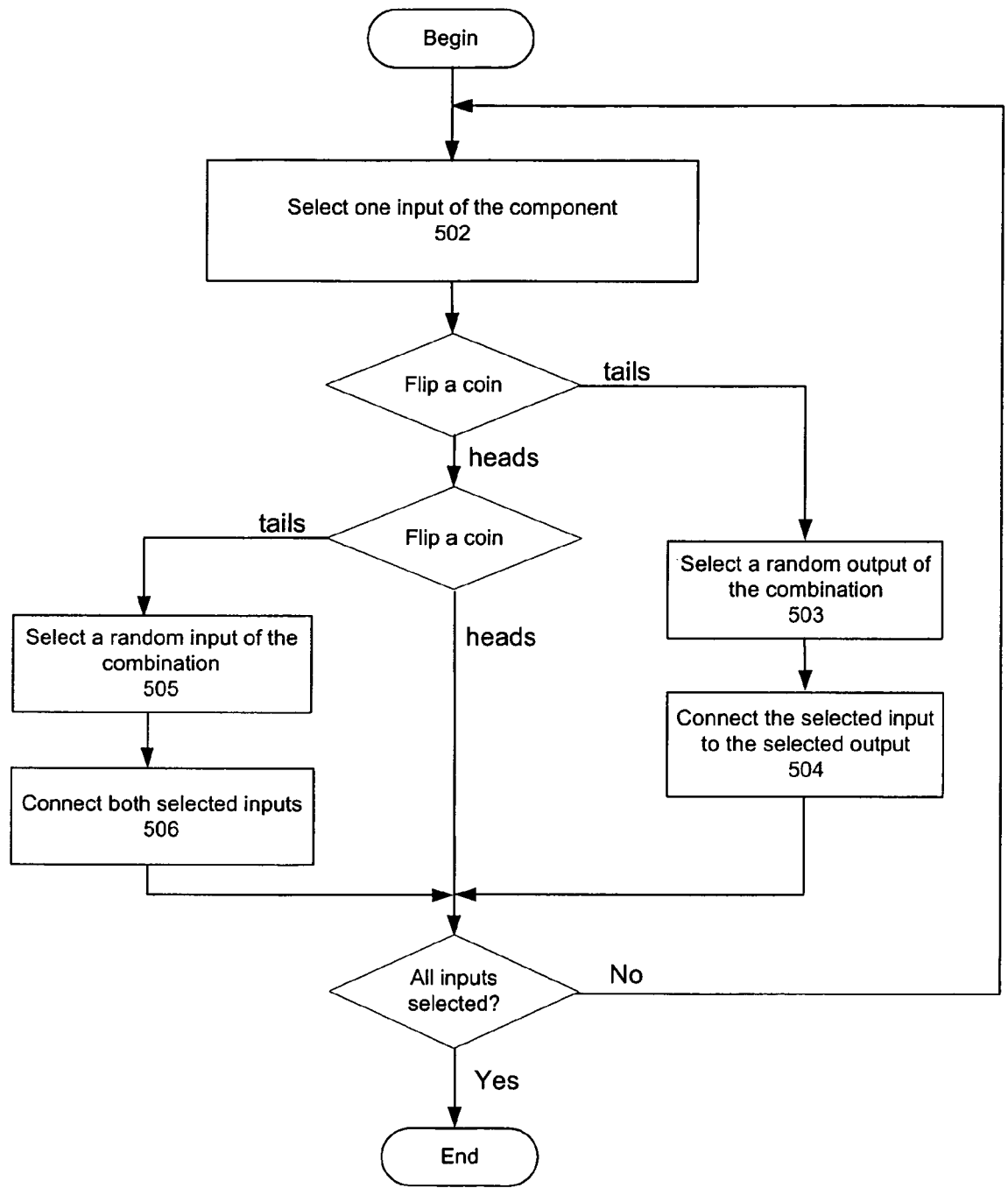
FIG. 5 is a flow chart illustrating an exemplary process of random wiring of a component and a combination in one embodiment of the present invention.
Figure 6:
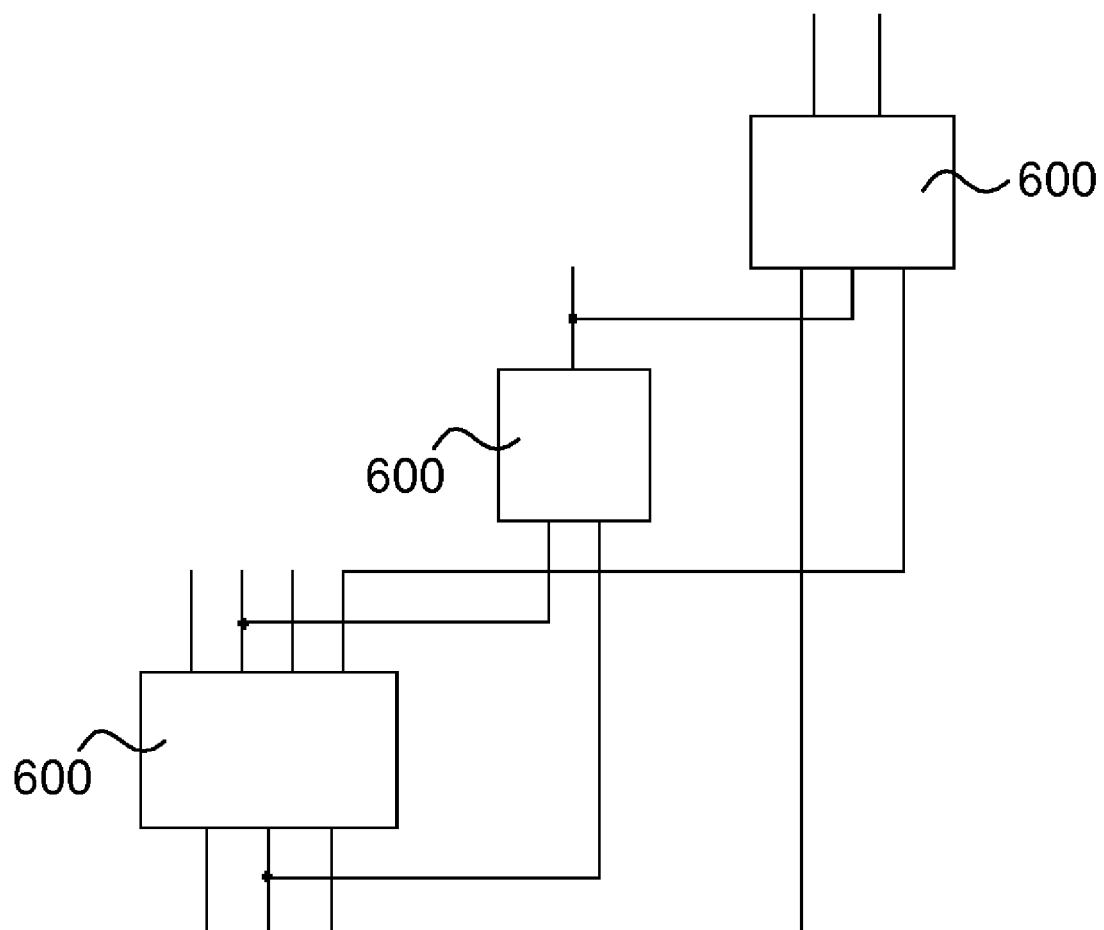
FIG. 6 is an exemplary combination of three components by random wiring in one embodiment of the present invention.

Randomly combine selected components. Combinations can be created by starting with one of the selected components and successively adding additional selected components through random wiring as described by the exemplary flow chart shown in FIG. 4. Each additional component can be added through random wiring as described by the exemplary flow chart shown in FIG. 5. For a non-limiting example, three components 600 might be wired together as shown in FIG. 6 where inputs are drawn on the bottom and outputs are drawn on the top of each component and combination.

Evaluate the combination. The function of the combination can be determined by computing, for each output, the BDD that describes the function of this output in terms of all inputs of the circuit. This step uses standard circuit analysis that is known to one skilled in the art and is not further described here. A combination is useful if it subsumes a component (see below) or if it better approximates some goal than all existing component.

Figure 7:
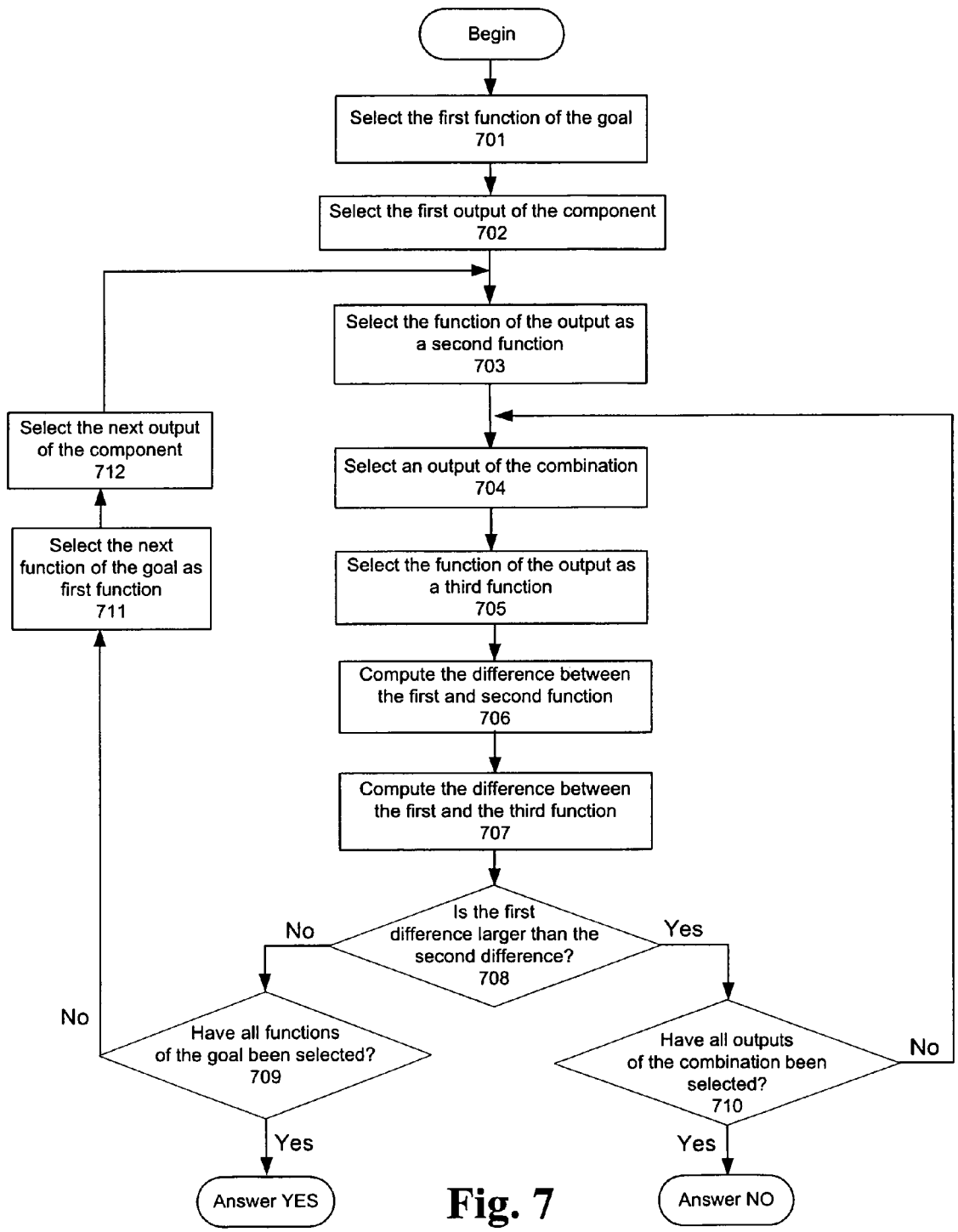
FIG. 7 is a flow chart illustrating an exemplary process of determining if a combination better approximates a goal than a given component in one embodiment of the present invention.

Note that a combination better approximates a goal than an existing component if there is at least one output of the combination with function f and one function g of the goal such that the difference between f and g is smaller than the difference between any function of any output of the component and g. FIG. 7 shows an exemplary flow chart describing this computation.

The difference of two logic functions is the percentage of input values for which the outputs of the two functions differ. This computation can be done efficiently based on the BDDs describing the two functions. This step follows directly from the theory of BDDs and is not further described here.

Figure 8:
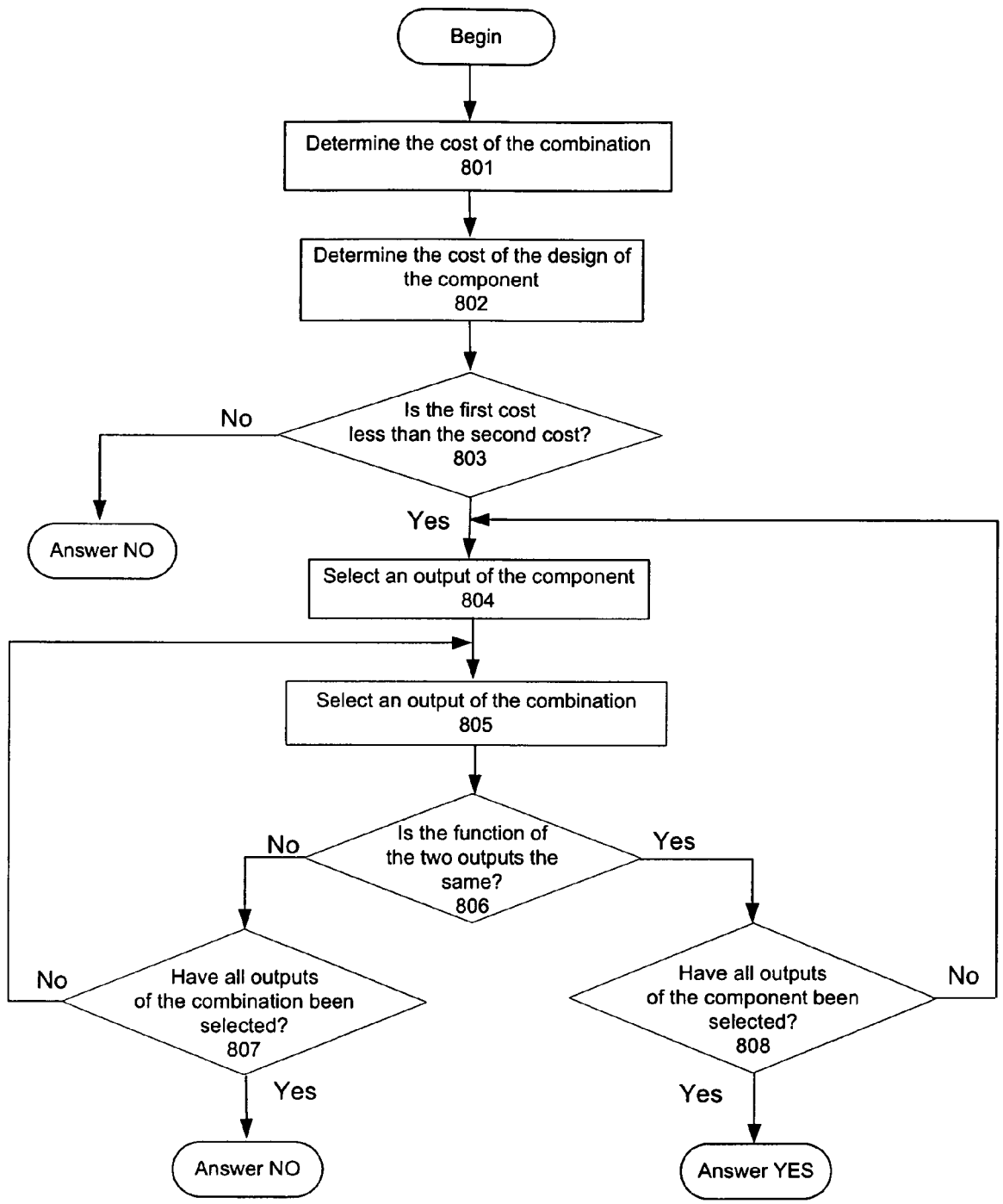
FIG. 8 is a flow chart illustrating an exemplary process of determining if a combination subsumes a component in one embodiment of the present invention.

A combination subsumes existing component. A combination subsumes an existing component if for every output of the component there is an output of the combination such that the two outputs have the same function, i.e., the same BDD, and if the cost of the combination is less than the cost of the component. The cost of a combination is the sum of the costs of its components where the cost of a component, in turn, is 1 plus the number of components of its design. FIG. 8 shows an exemplary flow chart describing how to determine if a combination subsumes a component.

Replace the design of subsumed component by a new combination. To replace the design of a component with a new combination, outputs and inputs of the new combination can be associated with outputs and inputs of the component and the design of the component is replaced with the new combination such that the functions remain unchanged.

Create a new component. Because the combination is useful and does not subsume an existing component, it better approximates some goal than all existing components. The combination can be encapsulated as a new component such that:

The design of the new component is the combination.

The interface of the new component consists of inputs and outputs as follows:

The inputs of the new component are the inputs of the combination.

For each function g of the goal the output of the combination whose function has the smallest difference to g of all outputs is selected. The outputs of the new components are the outputs of the combination selected in this way.

Replace improved components. If the newly created component better approximates its goal than an existing component then this existing component will be removed from the library.

Figure 9:
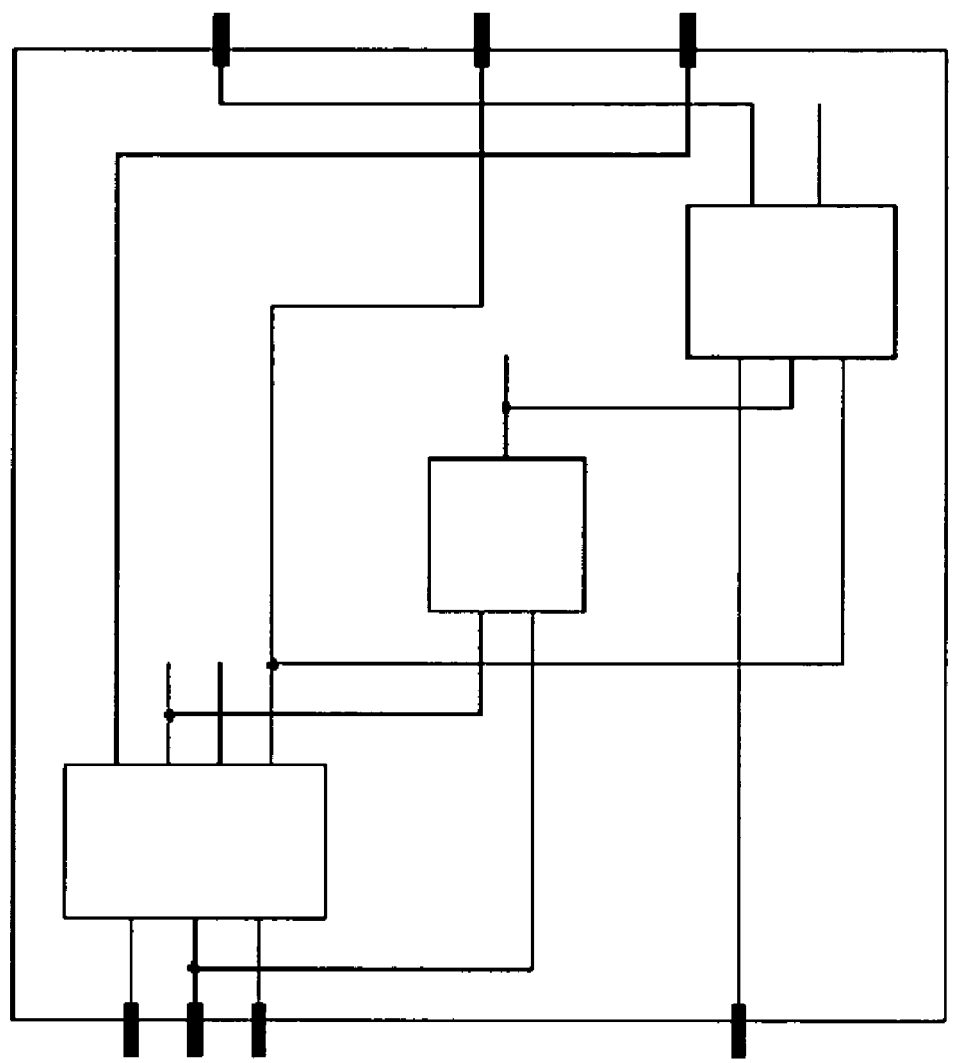
FIG. 9 shows an example of encapsulating a combination as a new component in one embodiment of the present invention.

In some embodiments, it can happen that a combination is useful for more than one goal. In this case it is encapsulated several times, once for each goal. In this case the resulting components will generally be quite different since they may have different interfaces and different outputs of the combination may be used in each. FIG. 9 shows an example of encapsulating a combination as a new component. Whereas all inputs of the combination are inputs of the component, not all outputs of the combination are used as outputs of the component. This may lead to components with designs that contain redundant, unused parts. If this happens, the algorithm of the present invention will, in due course, find a functionally equivalent combination that is more efficient.

Figure 10:
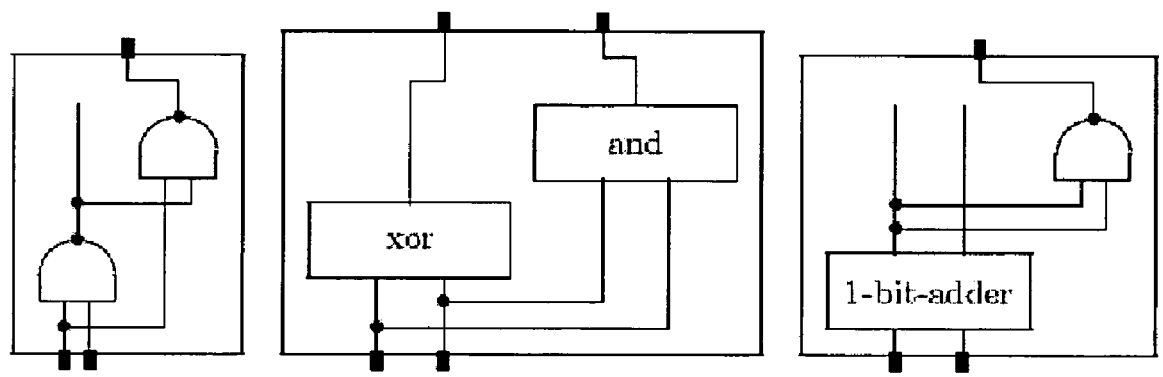
FIG. 10 shows some exemplary components generated for simple goals in one embodiment of the present invention.

FIG. 10 shows some exemplary components generated for simple goals. The examples illustrate some of the redundancy that arises in early components, e.g., the use of an adder to construct equivalence. Inefficiencies of this sort will be eliminated by replacement in due course. It should be appreciated that similar results will be achieved by starting with a different set of primitive components.

In some embodiments, the present invention can be applied to software components, which are software code in some programming language. The exact nature of the components will depend on the kind of components supported by the particular language. Thus, components might be subprograms, which can be but are not limited to, Fortran and C, objects, which can be but are not limited to, Java and C++, packages, which can be but are not limited to, Ada or the like. Various formal specification formalisms, which can be but are not limited to, axiomatic semantics and predicate transformers, can be used with the method.

In some embodiments, the present invention can be applied to process components, which are processes that operate independently and communicate by exchanging messages. The interface of a primitive process is given by the types of messages that can be sent and received. Processes can be composed by treating a cluster of processes as a single process. An interface of this new process restricts the types of messages that can be sent and received. Various formal description techniques, which can be but are not limited to, the calculus of communicating systems (CCS), communicating sequential processes (CSP) and $\pi$-calculus, can be used.

Figure 11:
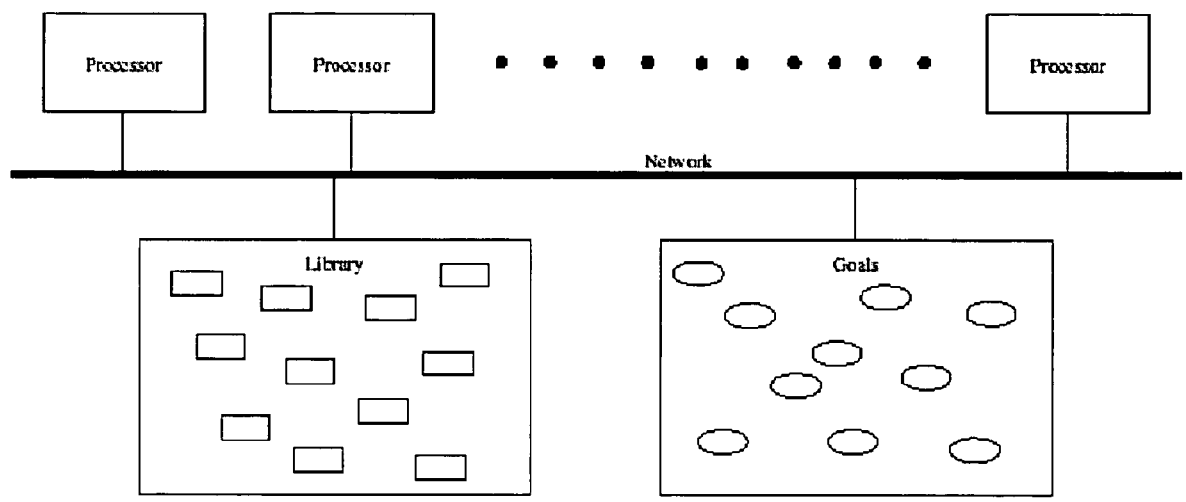
FIG. 11 shows an exemplary system having many processors sharing common storage for the library and goals in one embodiment of the present invention.

In some embodiments, the present invention can employ parallel computation to make efficient use of computer systems that have many processors sharing common storage for the library and goals as shown by the exemplary system in FIG. 11. Individual processors can construct and evaluate new combinations independent of each other. Consequently, there is no limit to the number of processors that can be employed to speed the automatic design. Standard software techniques for caching and replication of data can be employed to minimize memory contention and make it possible to use processors connected through a wide area network (WAN) over the Internet.

In some embodiments, the present invention can be used together with program testing. In this case each of the goals is a set of test cases given by the user. The fitness of a combination is determined by executing each to the test cases. However, the process has to be modified since it is not possible to determine whether two components are functionally equivalent. Even if two components behave identically for a set of test cases, they may differ for inputs not tested. It is therefore not possible to replace components by functionally equivalent, more efficient ones. Instead, it must be determined whether the result after replacement will still satisfy its tests before any such replacement.

Figure 12:
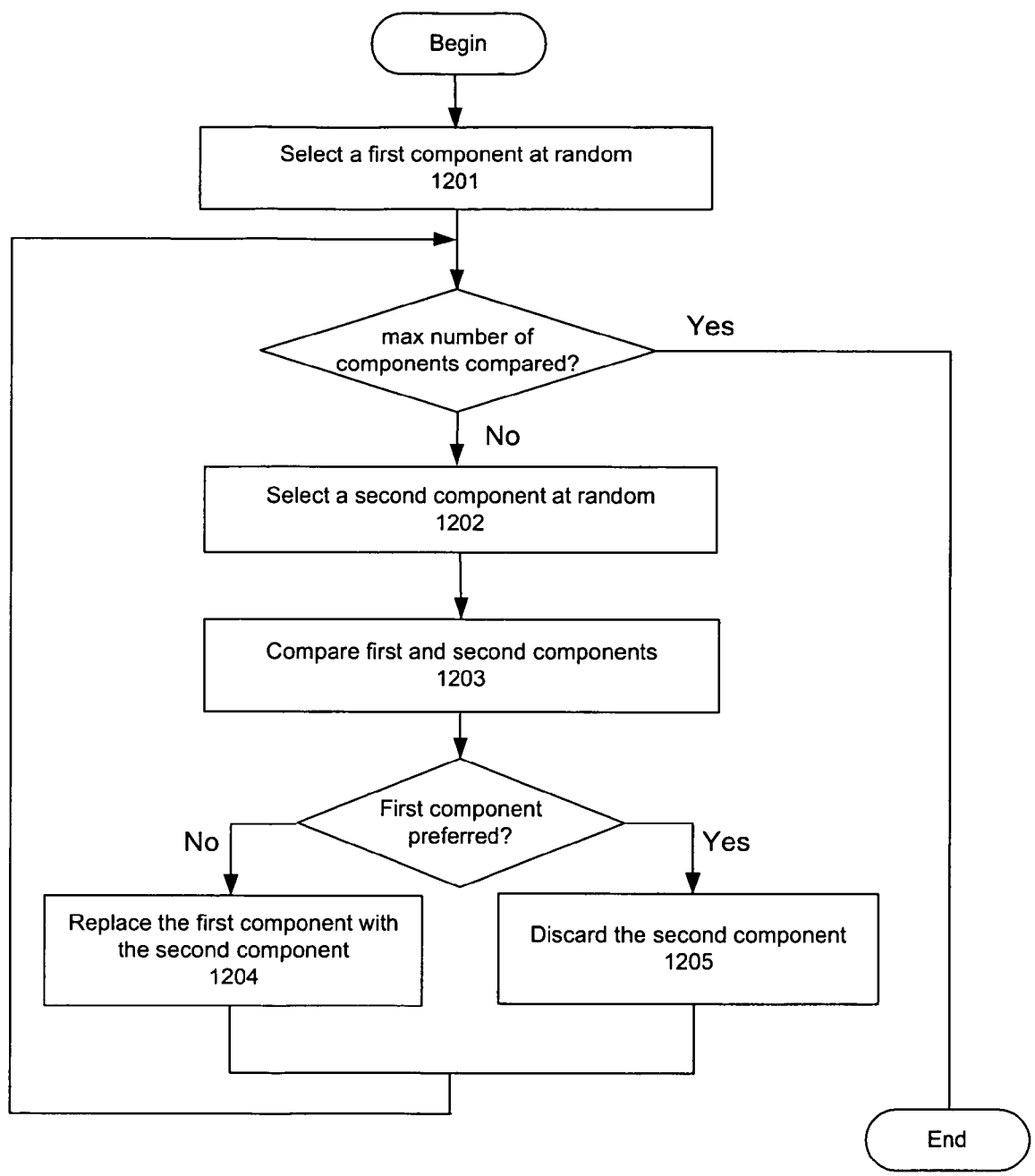
FIG. 12 is a flow chart illustrating an exemplary process of tournament selection in one embodiment of the present invention.

In some embodiments, the present invention can use alternative selection. Rather than selecting components for combination at random, certain components may be preferable. For a non-limiting example, components that have been successful in the construction of other components may be preferred. Alternatively, recently created components may be preferred for combination. To utilize such a preference, random selection of components can be replaced by tournament selection as described in the exemplary flowchart shown in FIG. 12. A first component is selected at random at step 1201 and is repeatedly compared at step 1203 with a second random component selected at step 1202. If the second component is preferred for combination over the first one, it will replace the first component at step 1204, otherwise it is discarded at step 1205. A total of $k_{max}$ components can be compared. The exact value of $k_{max}$ depends on the kind of components and should be between 1 and 4.

In some embodiments, the present invention can be combined with crossover operations. As described above, the invention constructs new combinations from simpler components. It is possible to additionally use a crossover technique of the type used in genetic programming to combine the designs of two components for the same goal into two combinations.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "module" is used in the embodiments of the systems and methods described above, it will be evident that such concept can be interchangeably used with equivalent concepts such as, bean, class, method, type, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

The entire disclosure of U.S. Patent App. Pub. No. 2005/0137992, entitled METHODS AND SYSTEMS FOR AUTOMATICALLY GENERATING PROVABLY CORRECT COMPUTER PROGRAM CODE by Wolfgang H. Polak, filed on Dec. 19, 2003, including specification, claims, drawings and abstract is incorporated herein by reference in its entirety.

What is claimed is:

1. A system for automatically generating at least one new component, the system comprising:
 a plurality of components, wherein each of the plurality of components performs a certain function;
 a component library to store the plurality of components;
 a processing device; and
 a persistent storage device coupled to the processing device for storing an executable component generation module, wherein the component generation module when executed causes the system to create the at least one new component, wherein the component generation module when executed further causes the system to:
  select a subset of the plurality of components in the component library;
  generate a combination by randomly combining the subset of the plurality of components;
  evaluate the combination against a plurality of goals, wherein the plurality of goals are formal specifications of a function of a desired component defined by a user;
  encapsulate the combination into the at least one new component, designate an observable interface for the at least one new component, and store the at least one new component in the component library if the combination meets one or more criteria, wherein each of the plurality of components is associated with a cost, wherein the cost comprises the number of subcomponents needed to build the combination.

2. The system according to claim 1,
 each of the plurality of components is composed hierarchically, represented and manipulated in a computer system.

3. The system according to claim 1, wherein:
 the plurality of goals are specified by the user via a formal logical language.

4. The system according to claim 1, wherein:
 the component generation module initializes the component library with a plurality of primitive components.

5. The system according to claim 1, wherein:
 the component generation module replaces a component in the plurality of components that either is subsumed by the combination or does not match the goal as well as the combination.

6. The system according to claim 1, wherein:
 the component generation module prefers a certain component over another in the subset of the plurality of components when generating the combination.

7. The system according to claim 1, wherein:
 the combination is more complex than any of the components in the subset of the plurality of components.

8. The system according to claim 1, wherein:
 each of the one or more criteria are one of:
  the combination has a valid function;
  the combination has a cheaper cost than any of the plurality of components; and
  the combination relates to the goal better than any of the plurality of components.

9. The system of claim 1, wherein the plurality of goals are vectors of logic functions.

10. The system of claim 9, wherein the vectors of logic functions are represented as vectors of binary decision diagrams.

11. The system of claim 1, wherein the combination is generated by wiring the subset of the plurality of components together.

12. A computer-implemented method to support automatic component library design comprising:
 storing a plurality of components in a component library, wherein each of the plurality of components performs a certain function;
 selecting a subset of the plurality of components in the component library;
 generating, by a component generation module executable on one or more computing devices, a combination by randomly combining the subset of the plurality of components;
 evaluating the combination against a plurality of goals, wherein the plurality of goals are formal specifications of a function of a desired component defined by a user;
 encapsulating the combination into a new component, designating an observable interface for the new component, and storing the new component into the component library if the combination meets one or more criteria, wherein each of the plurality of components is associated with a cost, wherein the cost comprises the number of subcomponents needed to build the combination; and
 generating at least one new component.

13. The computer-implemented method according to claim 12, further comprising:
 specifying one or more of the plurality of goals by the user via a formal logical language.

14. The computer-implemented method according to claim 12, further comprising:
 initializing the component library with a plurality of primitive components.

15. The computer-implemented method according to claim 12, further comprising:
   replacing a component in the plurality of components that either is subsumed by the combination or does not match the goal as well as the combination.

16. The computer-implemented method according to claim 12, further comprising:
   preferring certain component over another in the subset of the plurality of components when generating the combination.

17. The computer-implemented method according to claim 12, further comprising:
   generating the combination to be more complex than any of the components in the subset of the plurality of components.

18. The computer-implemented method according to claim 12, wherein:
   each of the one or more criteria are one of:
      the combination has a valid function;
      the combination has a cheaper cost than any of the plurality of components, wherein the cost is distinct from the function; and
      the combination relates to the goal better than any of the plurality of components.

19. A machine readable medium having instructions stored thereon that when executed cause a system to:
   store a plurality of components in a component library, wherein each of the plurality of components performs a certain function;
   select a subset of the plurality of components in the component library;
   generate, by a component generation module executable on one or more computing devices, a combination by randomly combining the subset of the plurality of components;
   evaluate the combination against a goal, wherein the plurality of goals are formal specifications of a function of a desired component defined by a user;
   encapsulate the combination into a new component, designate an observable interface for the new component, and store the new component into the component library if the combination meets one or more criteria, wherein each of the plurality of components is associated with a cost, wherein the cost comprises the number of subcomponents needed to build the combination; and
   generate at least one new component.

* * * * *